(12) United States Patent
Long

(10) Patent No.: US 8,881,617 B2
(45) Date of Patent: Nov. 11, 2014

(54) ROBOT ARM WITH CABLE PROTECTION STRUCTURE

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 257 days.

(21) Appl. No.: 13/458,454

(22) Filed: Apr. 27, 2012

(65) Prior Publication Data

US 2013/0145891 A1    Jun. 13, 2013

(30) Foreign Application Priority Data

Dec. 9, 2011    (CN) .......................... 2011 1 0408546

(51) Int. Cl.
*B25J 17/00*    (2006.01)
*B25J 17/02*    (2006.01)
*B25J 18/00*    (2006.01)

(52) U.S. Cl.
USPC ..................................... 74/490.02; 74/490.01

(58) Field of Classification Search
CPC ............ B25J 17/00; B25J 18/00; B25J 9/102; B25J 9/104
USPC ............... 74/490.01, 490.03, 490.05, 490.02; 901/27, 28
See application file for complete search history.

(56) References Cited

U.S. PATENT DOCUMENTS

| | | | |
|---|---|---|---|
| 6,696,810 B2 * | 2/2004 | Uematsu et al. .......... | 318/568.21 |
| 7,597,025 B2 * | 10/2009 | Narita et al. ............... | 74/490.02 |
| 8,286,527 B2 * | 10/2012 | Liu et al. .................... | 74/490.02 |
| 2008/0229861 A1 * | 9/2008 | Inoue et al. ................ | 74/490.01 |
| 2008/0264195 A1 | 10/2008 | Larsson et al. | |
| 2009/0114052 A1 * | 5/2009 | Haniya et al. .............. | 74/490.03 |
| 2011/0219906 A1 * | 9/2011 | Haniya et al. .............. | 74/490.03 |

FOREIGN PATENT DOCUMENTS

| | | |
|---|---|---|
| EP | 0621112 A1 | 10/1994 |
| TW | I273009 | 2/2007 |

* cited by examiner

*Primary Examiner* — Justin Krause
(74) *Attorney, Agent, or Firm* — Novak Druce Connolly Bove + Quigg LLP

(57) ABSTRACT

A robot arm includes a first shaft housing, a first driving mechanism, a second driving mechanism, a cable pass-through assembly and a cable assembly. The first shaft housing is hollow shaped, and includes a housing, a first mounting base and a second mounting base mounted on the housing. The first driving mechanism is mounted on the first mounting base. The second driving mechanism is mounted on the second mounting base. The cable pass-through assembly includes a first cable tube and a second cable tube. The cable assembly electrically connects with the first driving mechanism and the second driving mechanism. An axis of the first cable tube overlaps with an axis of the first mounting base. An axis of the second cable tube overlaps with an axis of the second mounting base. The cable assembly passes through the first cable tube and the second cable tube.

17 Claims, 2 Drawing Sheets

ROBOT ARM WITH CABLE PROTECTION STRUCTURE

BACKGROUND

1. Technical Field

The present disclosure generally relates to robots, and particularly to a robot arm with cable protection structure.

2. Description of Related Art

As developments in manufacturing technology progress, robots are increasingly applied to perform functions in environments considered hazardous or difficult for human operators.

Cables are provided to transmit electric signals or control signals for the specific elements or components of the robot. In order to maintain an orderly appearance, the cables are housed inside the robot and passed through a plurality of arms of the robot. When running from one arm to another, the cables pass through a plurality of holes in the arms. However, action of the arms may abrade or even sever the cables adjacent to the joint.

Therefore, there is room for improvement within the art.

BRIEF DESCRIPTION OF THE DRAWINGS

The components in the drawings are not necessarily drawn to scale, the emphasis being placed upon clearly illustrating the principles of the present disclosure. Moreover, in the drawings, like reference numerals designate corresponding parts throughout several views, and all the views are schematic.

DETAILED DESCRIPTION

Figure 1:
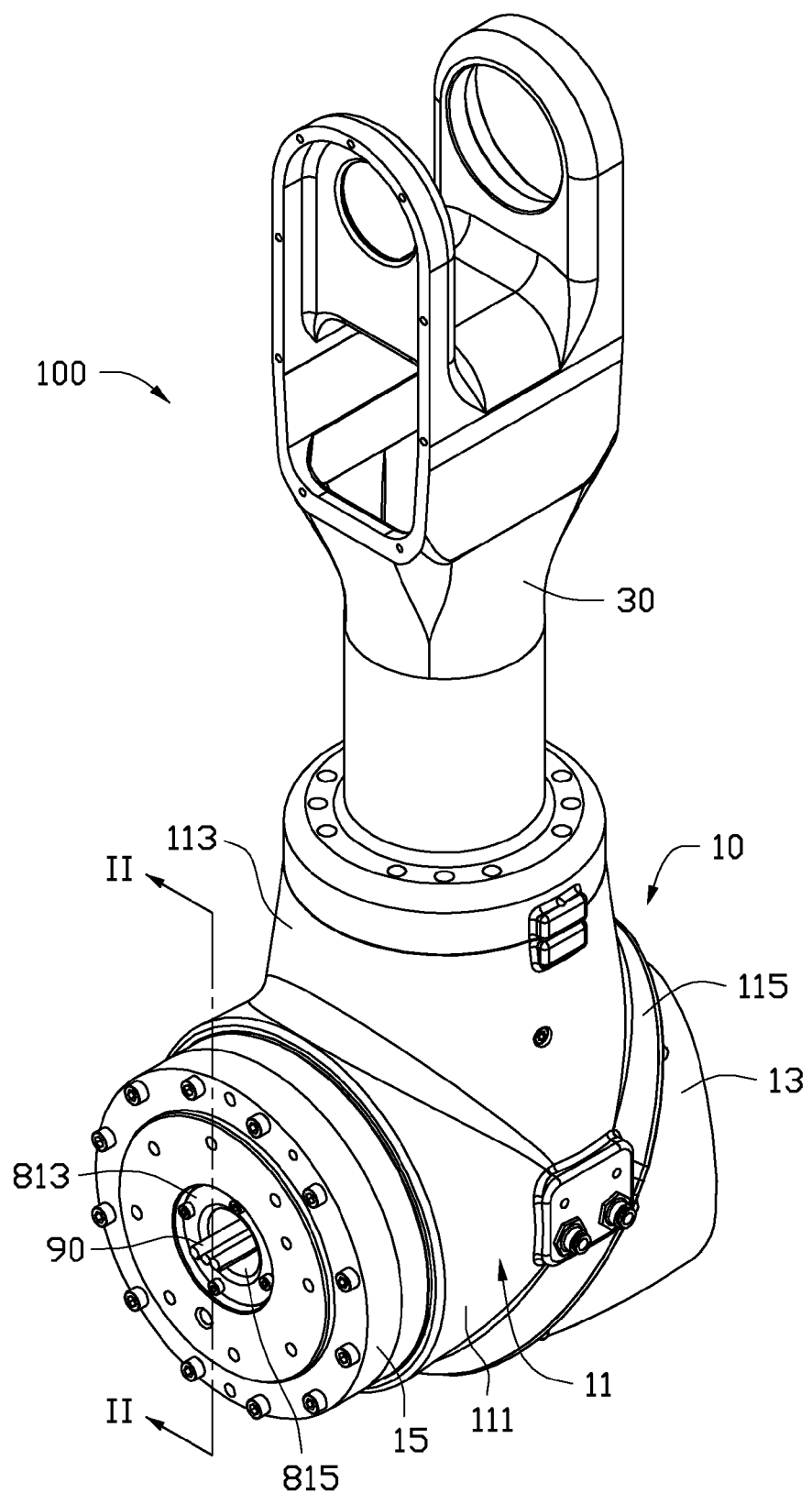
FIG. 1 shows an assembled isometric view of one embodiment of a robot arm.
Figure 2:
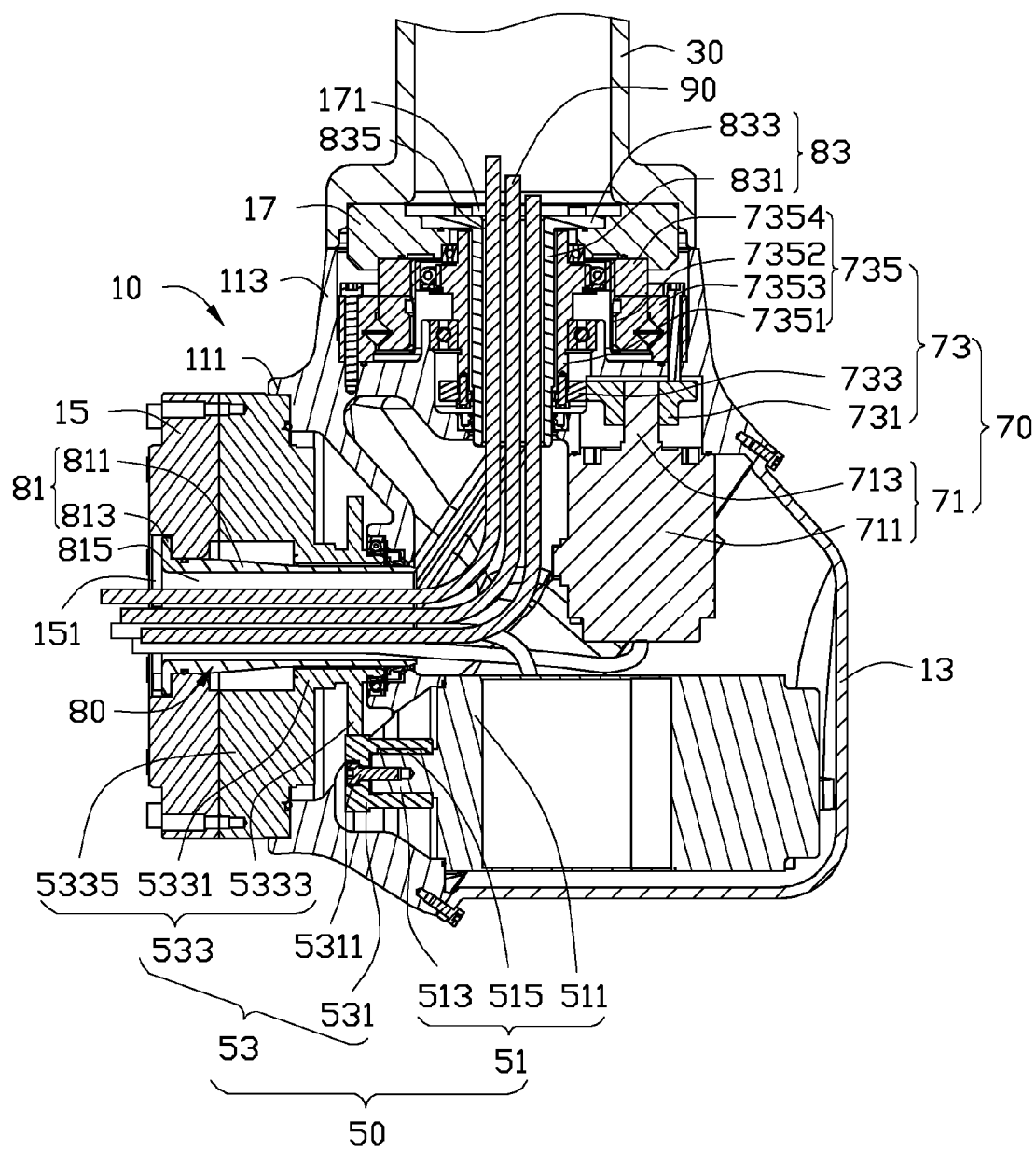
FIG. 2 is a partial, cross-section of the robot arm of FIG. 1, taken along a line labeled as II-II.

Referring to FIG. 1 and FIG. 2, an embodiment of a robot arm 100 includes a first shaft housing 10, a second shaft housing 30, a first driving mechanism 50, a second driving mechanism 70, a cable pass-through assembly 80, and a cable assembly 90. The first shaft housing 10 and the second shaft housing 30 are both hollow-shaped and rotatably assembled together. The first driving mechanism 50 is assembled in the first shaft housing 10, for driving another robot arm (not shown) connected to the first shaft housing 10 to rotate relative to the first shaft housing 10. The second driving mechanism 70 is assembled within the first shaft housing 10, and the second driving mechanism 70 connects with the second shaft housing 30, for driving the second shaft housing 30 to rotate relative to the first shaft housing 10. The cable pass-through assembly 80 is fixedly assembled within and passed through the first driving mechanism 50 and the second driving mechanism 70, for protecting the cable assembly 90. The cable assembly 90 passes through the cable pass-through assembly 80 for electrically connecting the first driving mechanism 50 and the second driving mechanism 70. In the illustrated embodiment, the cable assembly 90 includes a plurality of cables, in which one cable is connected to the first driving mechanism 50, and one cable is connected to the second driving mechanism 70. In the illustrated embodiment, the robot arm 100 is in use of a multi-axis robot.

The first shaft housing 10 includes a housing 11, a cover 13 fixedly mounted on a sidewall of the housing 11, a first mounting base 15 and a second mounting base 17 mounted on two ends of the housing 11. The housing 11 includes a first connecting portion 111, a second connecting portion 113, and a third connecting portion 115. The first connecting portion 111 substantially perpendicularly connects with the second connecting portion 113. The third connecting portion 115 is positioned besides a cross portion of the first connecting portion 111 and the second connecting portion 113. The cover 13 is mounted on the third connecting portion 115. The first mounting base 15 is substantially an annular cylinder, and is fixed to the first connecting portion 111, for mounting another robot arm (not shown). The first mounting base 15 defines a receiving groove 151 at a sidewall away from the first connecting portion 111, for allowing the cable pass-through assembly 80 to pass through. The axis of the first mounting base 15 overlaps with the axis of the first connecting portion 111. The second mounting base 17 is substantially an annular cylinder, and is fixed to the second connecting portion 113, for mounting the second shaft housing 30. The second mounting base 17 defines a receiving groove 171 at a sidewall away from the second connecting portion 113, for allowing the cable pass-through assembly 80 to pass through. The axis of the second mounting base 17 overlaps with the axis of the second connecting portion 113.

The second shaft housing 30 is substantially hollow-shaped and is rotatably connected to the second mounting portion 113 of the first shaft housing 10 by the second mounting base 17. The end of the second shaft housing 30 away from the first shaft housing 10 is substantially an "U" shaped body, for connecting with other assemblies (not shown) of the robot arm 100. The axis of the second shaft housing 30 overlaps with the axis of the second mounting base 17 and the second connecting portion 113.

The first driving mechanism 50 includes a first driving assembly 51 and a first transmission assembly 53 fixed with the first driving assembly 51. The first driving assembly 51 is fixed within the cover 13, and includes a first driver 511, a first driving shaft 513, and a stopping member 515. The first driving shaft 513 is located at an end of the first driver 511. The stopping member 515 protrudes from a sidewall of the first driving shaft 513. The first driver 511 drives the first driving shaft 513 to rotate. The first transmission assembly 53 is sleeved on the first driving shaft 513, and rotates following the rotation of the first driving shaft 513. The stopping member 515 prevents the first transmission assembly 53 from rotating relative to the first driving shaft 513.

The first transmission assembly 53 is fixed within the first connecting member 111 of the first shaft housing 10. The first transmission assembly 53 includes a first gear 531, and a second gear 533 meshing with the first gear 531. The first gear 531 is sleeved on the first driving shaft 513 and the stopping member 515, and the first gear 531 is fixed with the first driving shaft 513 via a fastener 5311. The second gear 533 is mounted on the first mounting base 15 at a side adjacent to the first driver 511. The second gear 533 includes a shaft portion 5331, a gear portion 5333, and a fixing portion 5335. The shaft portion 5331 is substantially an annular cylinder, and the axis of the shaft portion 5331 overlaps with the first connecting portion 111. The gear portion 5333 is located at an end of the shaft portion 5331 adjacent to the first driver 511, and the gear portion 5333 meshes with the first gear 531. The fixing portion 5335 is located at a distal end of the shaft portion 5331 opposite to the gear portion 5333. A diameter of the fixing portion 5335 substantially equal to a diameter of the first connecting portion 111. The fixing portion 5335 is fixed to the first mounting base 15 via fasteners (not shown).

The second driving mechanism 70 includes a second driving assembly 71 and a second transmission assembly 73 fixed with the second driving assembly 71. The second driving assembly 71 is fixed within the cover 13 and the third connecting portion 115, and includes a second driver 711 and a second driving shaft 713 mounted on an end of the second driver 711. The second driver 711 drives the second driving shaft 713 to rotate. The second transmission assembly 73 is sleeved on the second driving shaft 713, and rotates following the rotation of the second driving shaft 713.

The second transmission assembly 73 is fixed within the second connecting portion 113, and includes a third gear 731, a fourth gear 733 meshing with the third gear 731, and a speed reduction assembly 735 connected to the fourth gear 733. The third gear 731 is sleeved on the second driving shaft 713. The fourth gear 733 is sleeved on the speed reduction assembly 735, and the fourth gear 733 is fixed to the speed reduction assembly 735 via fasteners.

The axis of the speed reduction assembly 735 overlaps with the axis of the second connecting portion 113. The speed reduction assembly 735 includes a wave generator 7351, a flexspline 7352 sleeved on the wave generator 7351, a bearing 7353 and a rigid circular spline 7354 sleeved on the flexspline 7352. The fourth gear 733 is sleeved on the wave generator 7351, and is fixed to the wave generator 7351 via fasteners (not labeled in FIG. 2). The bearing 7353 is sleeved on the flexspline 7352, and is fixed to the first shaft housing 10 via fasteners (not labeled in FIG. 2). The rigid circular spline 7354 is sleeved on the flexspline 7352 adjacent to the second mounting base 17, and is fixed to the second mounting base 17 via fasteners (not shown).

The cable pass-through assembly 80 includes a first cable tube 81 and a second cable tube 83. The first cable tube 81 passes through the first mounting base 15 and the second gear 533. The first cable tube 81 is substantially T-shaped and includes a cylindrical base portion 811 and a fixing portion 813 coaxially disposed at one end of the base portion 811. A cable passage hole 815 is defined coaxially through the base portion 811 and the fixing portion 813, for allowing the cable assembly 90 to pass through. The base portion 811 of the first cable tube 81 passes through the first mounting base 15 and the second gear 533, and is partially received within the first shaft housing 10. The fixing portion 813 is fixed to the first mounting base 15 of the first shaft housing 10 via fasteners (not shown), and is received in the receiving groove 151 of the first mounting base 15. The axis of the first cable tube 81 overlaps with the axis of the first mounting base 15.

The second cable tube 83 passes through the second mounting base 17 and the wave generator 7351. The second cable tube 83 is substantially T-shaped and includes a cylindrical base portion 831 and a fixing portion 833 coaxially perpendicularly disposed at one end of the base portion 831. A cable passage hole 835 is defined coaxially through the base portion 831 and the fixing portion 833, for allowing the cable assembly 90 to pass through. The base portion 831 of the second cable tube 83 passes through the second mounting base 17 and the wave generator 7351, and is partially received in the first shaft housing 10. The fixing portion 833 is fixed to the second mounting base 17 of the second shaft housing 10 via fasteners (not shown), and is received in the receiving groove 171 of the second mounting base 17. The axis of the second cable tube 83 overlaps with the axis of the second mounting base 17.

One cable of the cable assembly 90 is connected to the first driver 511, another cable of the cable assembly 90 is connected to the second driver 711. The cable connected to the first driver 511 passes through the cable passage hole 815 to electrically connect with the first driver 511, for transmitting electrical power to the first driver 511. The cable connected to the second driver 711 passes through the cable passage hole 835 to electrically connect with the second driver 711, for transmitting electrical power to the second driver 711. Other cables of the cable assembly 90 pass through the cable passage hole 815 and the cable passage hole 835, and are connected to driving mechanisms of other robot arms located at an end of the second shaft housing 30 away from the first shaft housing 10.

In use, the cable assembly 90 transmits electrical power to the first driver 511 and the second driver 711, thus the first driver 511 drives the first driving shaft 513, the first gear 531, the second gear 533, and the first mounting base 15 to rotate, and the second driver 711 drives the second driving shaft 713, the third gear 731, the speed reduction assembly 735, and the second mounting base to rotate. The second mounting base 17 drives the second shaft housing 30 to rotate relative to the first shaft housing 10.

Since the first shaft housing 10 and the second shaft housing 30 are both hollow-shaped and rotatably assembled together via the first driving mechanism 50 and the second driving mechanism 70. The cable pass-through assembly 80 is fixedly assembled within the first shaft housing 10 and partially received within the first shaft housing 10, which is passing through the first driving mechanism 50 and the second driving mechanism 70. The first cable tube 81 is fixed to the first mounting base 15, and the second cable tube 83 is fixed to the second mounting base 17. The cable assembly 90 passes through the cable pass-through assembly 80 to electrically connect with the first driver 511 and the second driver 711. The axis of the first cable tube 81 overlaps with the axis of the first mounting base 15 and the first connecting portion 111, and the axis of the second cable tube 83 overlaps with the axis of the second mounting base 17 and the second connecting portion 113. Thus when the second shaft housing 30 or the first mounting base 15 is driven to rotate relative to the first shaft housing 10, the cable assembly 90 is received within the cable pass-through assembly 50, and can be substantially still and will not wind around the first shaft housing 10 and the second shaft housing 30, whereby damage is avoided; the lifespan of the cable assembly 90 is extended, and the stability of the robot arm 100 is enhanced. In addition, the cable assembly 90 is received within the first shaft housing 10 and the second shaft housing 30, the ageing speed of the cables are decreased by protected by the first shaft housing 10 and the second shaft housing 30.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A robot arm comprising:
a first shaft housing being hollow, the first shaft housing comprising a housing, a first mounting base and a second mounting base mounted on the housing;
a first driving mechanism mounted on the first mounting base of the first shaft housing, the first driving mechanism comprising a first driving assembly and a first transmission assembly fixed to the first driving assembly, the first transmission assembly being fixed to the first mounting base, the first driving assembly being configured to drive the first mounting base to rotate via the first transmission assembly;
a second driving mechanism mounted on the second mounting base of the first shaft housing, the second mechanism comprising a second driving assembly and a second transmission assembly fixed to the second driving assembly, the second transmission assembly being fixed to the second mounting base, the second driving assembly being configured to drive the second mounting base to rotate via the second transmission assembly, the second transmission assembly comprising a third gear fixed to the second driving assembly, a fourth gear meshing with the third gear, and a speed reduction assembly fixed to the fourth gear, the speed reduction assembly being fixed to the second mounting base, an axis of the speed reduction assembly overlapping with the axis of the second mounting base;

a cable pass-through assembly received within the first shaft housing, comprising a first cable tube passing through the first driving mechanism and the first mounting base, and a second cable tube passing through the second driving mechanism and the second mounting base, the first cable tube passing through the first transmission assembly, and the second cable tube passing through the second transmission assembly; and a cable assembly electrically connecting with the first driving assembly and the second driving assembly;

wherein an axis of the first cable tube overlaps with an axis of the first mounting base; an axis of the second cable tube overlaps with an axis of the second mounting base; the cable assembly passes through the first cable tube and the second cable tube; the first driving mechanism drives the first mounting base to rotate, and the second driving mechanism drives the second mounting base to rotate, the second cable tube passes through the speed reduction assembly.

2. The robot arm of claim 1, wherein the first transmission assembly comprises a first gear and a second gear meshing with the first gear; the first gear is fixed to the driving assembly; the second gear is fixed to the first mounting base; an axis of the second gear overlaps with the axis of the first mounting base, the first cable tube passes through the second gear.

3. The robot arm of claim 1, wherein the first shaft housing further comprises a cover fixed to the housing, the first driving mechanism, the second driving mechanism, and the cable pass-through assembly are assembled within the housing and the cover.

4. The robot arm of claim 1 further comprising a second shaft housing, wherein the second shaft housing is hollow and rotatably assembled to the second mounting base of the first shaft housing; the second shaft housing is fixed to the second mounting base, the first cable tube is fixed to the first mounting base, the second cable tube is fixed to the second mounting base.

5. The robot arm of claim 4, wherein the first cable tube comprises a base portion and a fixing portion coaxially disposed at one end of the base portion; the base portion passes through the first mounting base and the first driving mechanism; a cable passage hole is defined coaxially through the base portion and the fixing portion, for allowing the cable assembly to pass through.

6. The robot arm of claim 5, wherein the first mounting base defines a receiving groove; the fixing portion is received in the receiving groove, and the fixing portion is fixed to the first mounting base.

7. The robot arm of claim 4, wherein the second cable tube comprises a base portion and a fixing portion coaxially perpendicularly disposed at one end of the base portion; the base portion passes through the second mounting base and the second driving mechanism; a cable passage hole is defined coaxially through the base portion and the fixing portion, for allowing the cable assembly to pass through.

8. The robot arm of claim 7, wherein the second mounting base defines a receiving groove; the fixing portion is received in the receiving groove, and the fixing portion is fixed to the second mounting base.

9. A robot arm comprising:
 a first shaft housing being hollow, the first shaft housing comprising a housing, a first mounting base and a second mounting base mounted on the housing;
 a second shaft housing being hollow, and rotatably assembled to the second mounting base of the first shaft housing;
 a first driving mechanism mounted on the first mounting base of the first shaft housing, the first driving mechanism comprising a first driving assembly and a first transmission assembly fixed to the first driving assembly, the first transmission assembly being fixed to the first mounting base, the first driving assembly being configured to drive the first mounting base to rotate via the first transmission assembly;
 a second driving mechanism mounted on the second mounting base of the first shaft housing, the second mechanism comprising a second driving assembly and a second transmission assembly fixed to the second driving assembly, the second transmission assembly being fixed to the second mounting base, the second driving assembly being configured to drive the second mounting base to rotate via the second transmission assembly, the second transmission assembly comprising a third gear fixed to the second driving assembly, a fourth gear meshing with the third gear, and a speed reduction assembly fixed to the fourth gear, the speed reduction assembly being fixed to the second mounting base, an axis of the speed reduction assembly overlapping with the axis of the second mounting base;
 a cable pass-through assembly received within the first shaft housing, comprising a first cable tube passing through the first driving mechanism and the first mounting base, and a second cable tube passing through the second driving mechanism and the second mounting base; the first cable tube defining a cable passage hole; the second cable tube defining a cable passage hole, the first cable tube passing through the first transmission assembly, and the second cable tube passing through the second transmission assembly;
 a cable assembly passing through the cable passage hole of the first cable tube and the cable passage hole of the second cable tube, and electrically connecting with the first driving assembly and the second driving assembly;
 wherein an axis of the first cable tube overlaps with an axis of the first mounting base; an axis of the second cable tube overlaps with an axis of the second mounting base; the cable assembly passes through the first cable tube and the second cable tube; the first driving mechanism drives the first mounting base to rotate, and the second driving mechanism drives the second shaft housing to rotate, the second cable tube passes through the speed reduction assembly.

10. The robot of claim 9, wherein an axis of the first transmission assembly overlaps with the axis of the first mounting base; an axis of the second transmission assembly overlaps with the axis of the second mounting base.

11. The robot of claim 10, wherein the first driving assembly comprises a first driver, a first driving shaft fixed to the first driver, and a stopping member protrudes from a sidewall of the first driving shaft; the first transmission assembly is sleeved on the first driving shaft and the stopping member; the first driver drives the first mounting base to rotate via the first driving shaft and the first transmission assembly; the stopping member prevents the transmission assembly to rotate relative to the first driving shaft.

12. The robot of claim 11, wherein the second driving assembly comprises a second driver and a second driving shaft fixed to the first driver; the second transmission assembly is sleeved on the second driving shaft; the second driver drives the second shaft housing to rotate via the second driving shaft, the second transmission assembly and the second mounting base.

13. The robot of claim 12, wherein, the cable assembly includes a plurality of cables, in which one cable is electrically connected to the first driver, and one cable is electrically connected to the second driver.

14. The robot of claim 9, wherein first cable tube comprises a base portion and a fixing portion coaxially disposed at one end of the base portion; the base portion passes through the first mounting base and the first driving mechanism; the cable passage hole of the first cable tube is coaxially defined through the base portion and the fixing portion.

15. The robot of claim 14, wherein the first mounting base defines a receiving groove; the fixing portion is received in the receiving groove, and the fixing portion is fixed to the first mounting base.

16. The robot of claim 9, wherein the second cable tube comprises a base portion and a fixing portion coaxially disposed at one end of the base portion; the base portion passes through the second mounting base and the second driving mechanism; the cable passage hole of the second cable tube is coaxially defined through the base portion and the fixing portion.

17. The robot of claim 16, wherein the second mounting base defines a receiving groove; the fixing portion is received in the receiving groove, and the fixing portion is fixed to the second mounting base.

* * * * *